United States Patent
Kamiya

(10) Patent No.: US 8,223,371 B2
(45) Date of Patent: Jul. 17, 2012

(54) IMAGE FORMING APPARATUS, DATA PROCESSING METHOD, PROGRAM, AND STORAGE MEDIUM

(75) Inventor: Yuka Kamiya, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 821 days.

(21) Appl. No.: 12/388,150

(22) Filed: Feb. 18, 2009

(65) Prior Publication Data

US 2009/0213407 A1    Aug. 27, 2009

(30) Foreign Application Priority Data

Feb. 22, 2008 (JP) ................. 2008-042065

(51) Int. Cl.
*G06F 3/12* (2006.01)
*G06F 21/00* (2006.01)
*G06F 19/00* (2011.01)
*G06Q 10/00* (2012.01)

(52) U.S. Cl. ........... 358/1.15; 358/1.16; 358/1.14; 705/7.27; 705/59; 700/102; 700/110

(58) Field of Classification Search .......... None
See application file for complete search history.

(56) References Cited

U.S. PATENT DOCUMENTS
2008/0002220 A1 * 1/2008 Song ................ 358/1.15

FOREIGN PATENT DOCUMENTS
JP    2006-302093    11/2006

\* cited by examiner

*Primary Examiner* — Thomas Lett
(74) *Attorney, Agent, or Firm* — Fitzpatrick, Cella, Harper & Scinto

(57) ABSTRACT

In a data processing method, import request data transmitted from a client is received. By comparing the application list against information indicating license settings of the application that are stored in advance, a determination is made as to whether or not the processing specified in a workflow is executable. A temporary workflow list is created, and a determination is made as to whether or not the upper limit for the registerable workflow number and data size is exceeded. When it is determined as registerable, execution data for executing respective workflows and display data for controlling display included in the temporary workflow list are acquired from the client, and the display is controlled so as to display the executable workflow and the inexecutable workflow in a fashion such that the executable workflow and the inexecutable workflow can be identified.

16 Claims, 15 Drawing Sheets

| FLOW ID | SIZE (Kbyte) | EXECUTE | STORAGE LOCATION |
|---|---|---|---|
| 000001 | 15 | ACCEPTABLE | MULTI-FUNCTION PERIPHERAL |
| 000002 | 10 | NOT ACCEPTABLE | MULTI-FUNCTION PERIPHERAL |
| 000003 | 5 | ACCEPTABLE | MULTI-FUNCTION PERIPHERAL |
| 000004 | 30 | ACCEPTABLE | MULTI-FUNCTION PERIPHERAL |
| 000005 | 20 | NOT ACCEPTABLE | MULTI-FUNCTION PERIPHERAL |

FIG. 8

| FLOW ID | SIZE (Kbyte) | EXECUTE |
|---|---|---|
| 000001 | 15 | ACCEPTABLE |
| 000002 | 10 | NOT ACCEPTABLE |
| 000003 | 5 | ACCEPTABLE |
| 000004 | 30 | ACCEPTABLE |
| 000005 | 20 | NOT ACCEPTABLE |

| FLOW ID | SIZE (Kbyte) | EXECUTE | |
|---|---|---|---|
| 000001 | 20 | ACCEPTABLE | OVERWRITE |
| 000002 | 15 | ACCEPTABLE | OVERWRITE |
| 000003 | 5 | ACCEPTABLE | |
| 000004 | 30 | ACCEPTABLE | |
| 000005 | 20 | NOT ACCEPTABLE | OVERWRITE |
| 000006 | 25 | ACCEPTABLE | ADD |

| FLOW ID | SIZE (Kbyte) | EXECUTE | STORAGE LOCATION |
|---|---|---|---|
| 000001 | 15 | ACCEPTABLE | MULTI-FUNCTION PERIPHERAL |
| 000002 | 10 | NOT ACCEPTABLE | MULTI-FUNCTION PERIPHERAL |
| 000003 | 5 | ACCEPTABLE | MULTI-FUNCTION PERIPHERAL |
| 000004 | 30 | ACCEPTABLE | MULTI-FUNCTION PERIPHERAL |
| 000005 | 20 | NOT ACCEPTABLE | MULTI-FUNCTION PERIPHERAL |

FIG. 14

| FLOW ID | SIZE (Kbyte) | EXECUTE | STORAGE LOCATION |
|---|---|---|---|
| 000001 | 20 | ACCEPTABLE | MULTI-FUNCTION PERIPHERAL |
| 000002 | 15 | ACCEPTABLE | MULTI-FUNCTION PERIPHERAL |
| 000003 | 5 | ACCEPTABLE | MULTI-FUNCTION PERIPHERAL |
| 000004 | 30 | ACCEPTABLE | MULTI-FUNCTION PERIPHERAL |
| 000005 | 20 | NOT ACCEPTABLE | MULTI-FUNCTION PERIPHERAL |
| 000006 | 25 | ACCEPTABLE | MULTI-FUNCTION PERIPHERAL |

F I G. 18

| FLOW ID | SIZE (Kbyte) | EXECUTE | STORAGE LOCATION |
|---|---|---|---|
| 000001 | 20 | ACCEPTABLE | MULTI-FUNCTION PERIPHERAL |
| 000002 | 15 | ACCEPTABLE | MULTI-FUNCTION PERIPHERAL |
| 000003 | 5 | ACCEPTABLE | MULTI-FUNCTION PERIPHERAL |
| 000004 | 30 | ACCEPTABLE | MULTI-FUNCTION PERIPHERAL |
| 000005 | 20 | NOT ACCEPTABLE | SERVER |
| 000006 | 25 | ACCEPTABLE | MULTI-FUNCTION PERIPHERAL |

~1801

IMAGE FORMING APPARATUS, DATA PROCESSING METHOD, PROGRAM, AND STORAGE MEDIUM

BACKGROUND OF THE INVENTION

1. Field of the Invention

The present invention relates to an image forming technique and to a data processing technique in an image forming apparatus.

2. Description of the Related Art

Recently, multi-function peripheral devices with various functions added to a digital copier as a base have been in practical use. Workflows can be transmitted and received between devices, and between a device and an information processing device (PC), but there are limitations on the number and the size of the workflows that can be stored in the device, and failures frequently occur when importing workflows. Furthermore, because it takes a large amount of time to import a large amount of workflows, it is preferable that the processing be successful in one import operation.

Japanese Patent Laid-Open No. 2006-302093 proposes detecting whether or not a total size of the image file exceeds the remaining capacity of the storage region on the server when uploading the image from a client PC to a server. Then, in the case where the capacity of the storage region is exceeded, images of an amount that will not exceed the capacity are automatically selected and uploaded based on the degree of similarity between these images.

Inexecutable workflows that remain registered in the device are a major factor causing the number and the size of workflows to exceed device capacity. As a solution, these inexecutable workflows can be deleted, but a new problem then arises in that it is inconvenient to simply delete a workflow right away even if it is an inexecutable flow.

To be specific, recently, in-device applications (scanning, sending, and printing) that can be defined as workflows are also license-managed, and some applications even provide a trial period. An e-mail sending function is an example of such a case. When the trial period of the e-mail sending function ends, all the workflows defined as the e-mail sending function end in errors. However, because there is the possibility that the license will be purchased later on, it is inconvenient if the workflows defined as such a function are deleted immediately as soon as the license has expired.

SUMMARY OF THE INVENTION

An aspect of the present invention relates to achieving efficient import of workflows, even if the capacity of the storage region is insufficient, by eliminating inexecutable workflows from the import target.

An aspect of the present invention relates to enabling the execution of desired workflows when the workflows are in an executable state by, for example, a status change in license settings, by using data evacuated externally without re-registering the workflow.

According to one aspect of the present invention, there is provided an image forming apparatus comprising: a receiving unit adapted to receive, for determining whether or not a workflow specifying processing to be executed by a combination of a plurality of functions can be registered, import request data including the number of workflows transmitted from a client, the data size for executing the workflow, and a list of applications for executing the workflow, an executability determination unit adapted to determine whether or not the processing specified in the workflow is executable by comparing the list of applications against information indicating license settings of the applications stored in advance, a creation unit adapted to create a temporary workflow list in which the data size and determination results of the executability determination unit are listed in correspondence with respective workflows, a registration availability determination unit adapted to determine whether or not an upper limit on the number of workflows and the data size that can be registered is exceeded based on the number of workflows and the data size included in the temporary workflow list, an acquiring unit adapted to acquire, from the client, execution data for executing respective workflows and display data for controlling display of a display unit included in the temporary workflow list and to register the data when the registration availability determination unit has determined that the data can be registered, and a display control unit adapted to display executable workflows and inexecutable workflows on the display unit in such a fashion that the executable workflows and the inexecutable workflows are identifiable based on the display data acquired by the acquiring unit.

According to another aspect of the present invention, there is provided a data processing method in an image forming apparatus, the method comprising: a receiving step of receiving, for determining whether or not a workflow specifying processing to be executed by a combination of a plurality of functions can be registered, import request data including the number of workflows transmitted from a client, the data size for executing the workflow, and a list of applications for executing the workflow, an executability determination step of determining whether or not the processing specified in the workflow is executable by comparing the list of applications against information indicating license settings of the applications stored in advance, a creation step of creating a temporary workflow list in which the data size and determination results of the executability determination step are listed in correspondence with respective workflows, a registration availability determination step of determining whether or not an upper limit on the number of workflows and the data size that can be registered is exceeded based on the number of workflows and the data size included in the temporary workflow list, an acquiring step of acquiring, from the client, execution data for executing respective workflows and display data for controlling display of a display unit included in the temporary workflow list and registering the data when it has been determined that the data can be registered in the registration availability determination step, and a display control step of displaying executable workflows and inexecutable workflows on the display unit in such a fashion that the executable workflows and the inexecutable workflows are identifiable based on the display data acquired in the acquiring step.

According to the present invention, workflows can be efficiently imported, even if the capacity of the storage region is insufficient, by eliminating inexecutable workflows from the import target.

Or, desired workflows can be executed when the workflows are in an executable state by, for example, a status change in license settings, by using data evacuated externally without re-registering the workflow, increasing convenience for users.

Further features of the present invention will become apparent from the following description of exemplary embodiments (with reference to the attached drawings).

BRIEF DESCRIPTION OF THE DRAWINGS

FIG. 8 is a diagram illustrating an example of a workflow list.

FIG. 13 is a diagram illustrating an example of a workflow list.

FIG. 14 is a diagram illustrating an example of a temporary workflow list.

FIG. 18 is a diagram illustrating an example of a workflow list.

DESCRIPTION OF THE EMBODIMENTS

Hereinafter, exemplary preferred embodiments of the present invention shall be described in detail with reference to the diagrams. However, it should be noted that the constituent elements denoted in the following embodiments are to be taken as examples only; the technical scope of the present invention is defined by the appended claims, and is not intended to be limited by the individual embodiments described hereinafter.

First Embodiment

Figure 1:
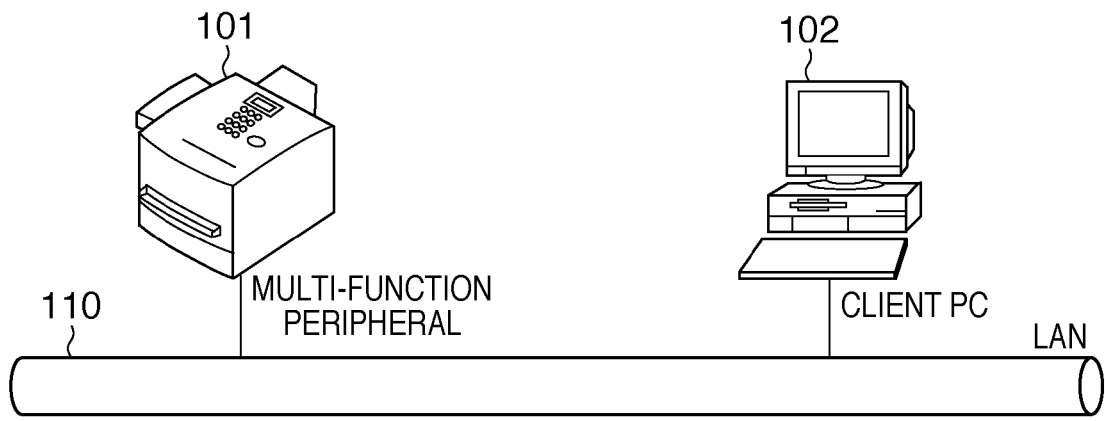
FIG. 1 is a diagram illustrating a first exemplary configuration of an image forming system according to an embodiment of the present invention.

FIG. 1 is a diagram illustrating a first exemplary configuration of an image forming system. In the first exemplary configuration shown in FIG. 1, a multi-function peripheral 101 serving as an example of an image forming apparatus can be connected to a client PC 102 and a LAN 110, and can communicate with each other.

The client PC 102 is capable of creating and editing a workflow that is executable by the multi-function peripheral 101, and workflows can be transmitted/received by communicating with the multi-function peripheral 101 via the LAN 110. In FIG. 1, a configuration including the multi-function peripheral 101 and the client PC 102 is shown as an exemplary configuration of the image forming system. The multi-function peripheral 101 can also create, edit, and transmit/receive workflows, and the image forming system may be configured by replacing the client PC 102 with another multi-function peripheral.

Figure 2:
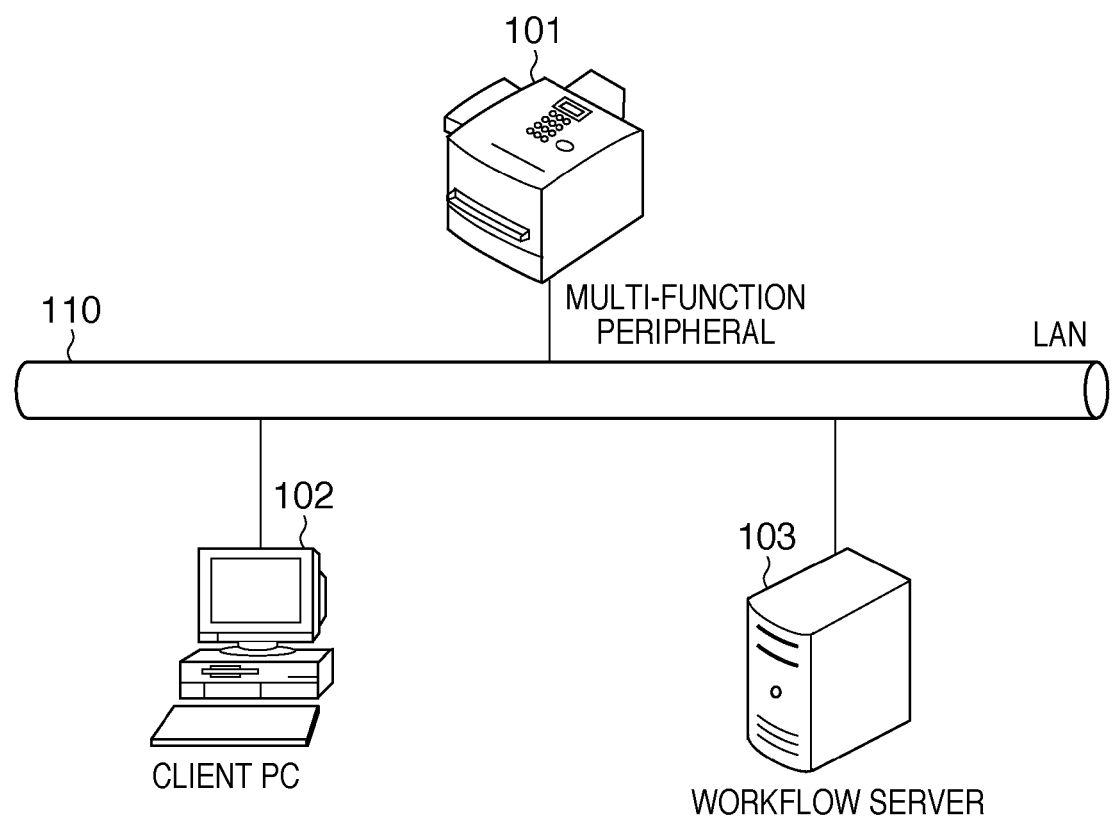
FIG. 2 is a diagram illustrating a second exemplary configuration of an image forming system according to an embodiment of the present invention.

FIG. 2 is a diagram illustrating a second exemplary configuration of an image forming system. In the second exemplary configuration shown in FIG. 2, a multi-function peripheral 101 serving as an example of an image forming apparatus can be connected to a client PC 102, a workflow server 103 capable of managing workflows, and a LAN 110, and these elements are capable of communicating with each other. The client PC 102 is capable of creating and editing a workflow that is executable by the multi-function peripheral 101, and workflows can be transmitted/received to and from the multi-function peripheral 101 or the workflow server 103 via the LAN 110.

Figure 3:
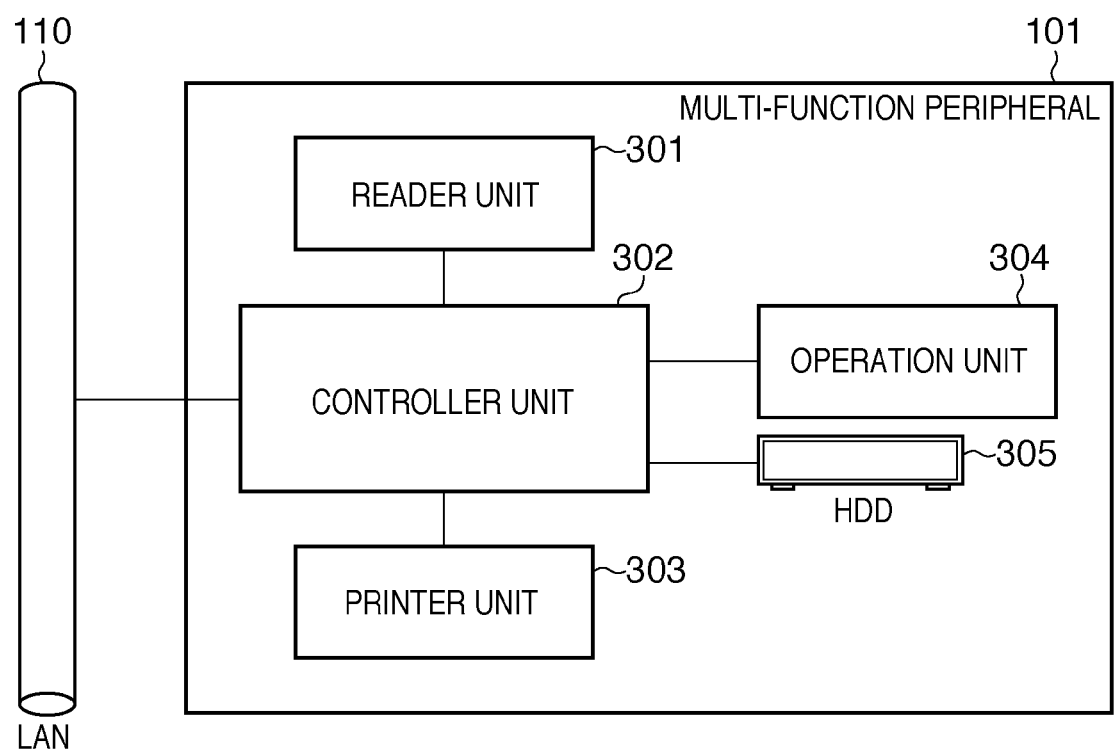
FIG. 3 is a diagram illustrating the hardware configuration of a multi-function peripheral 101 according to an embodiment of the present invention.

FIG. 3 is a diagram illustrating the hardware configuration of a multi-function peripheral 101 according to an embodiment of the present invention. A reader unit 301 optically reads images of an original document, and converts the images into image data. The reader unit 301 is configured of a scanner unit with a function for reading an original document, and an original document paper-feeding unit with a function for conveying original document paper. Depending on the device configuration, a configuration without the original document paper-feeding unit, for example, a configuration in which the original document is placed on a platen glass, that is, what is known as a pressure plate, and is read with a sensor.

A printer unit 303 conveys recording paper, prints image data as visual images on the recording paper, and ejects the recording paper to the outside of the image forming apparatus. The printer unit 303 is configured of a paper-feeding unit having a variety of recording paper cassettes, a fixing unit that transfers and fixes the image data onto the recording paper, and an ejection unit that sorts, staples, and outputs the printed recording paper to the outside of the apparatus. A controller unit 302 controls the multi-function peripheral 101, and includes a CPU, a ROM, and a RAM, which are not shown. The controller unit 302 is electrically connected with the reader unit 301 and the printer unit 303, and further with the LAN 110.

The controller unit 302 controls the reader unit 301 to read image data of the original document, and controls the printer unit 303 to form the image data on the recording paper, thereby providing copy functions.

Furthermore, the controller unit 302 converts the image data read from the reader unit 301 to code data, and transmits the code data to the host computer via the LAN 110, thereby providing network scanner functions. Also, the controller unit 302 registers the image data read with the reader unit 301 to a box, that is, a storage service, provided in the HDD 305, thereby providing box scan functions.

Furthermore, the controller unit 302 converts the code data received from the host computer via the LAN 110 to image data, and outputs the data to the printer unit 303, thereby providing printer functions.

An operation unit 304 is provided with a user I/F having a liquid crystal display unit, a touch panel input device applied to the surface of the liquid crystal display unit, and a plurality of physical keypads for users to execute various operations. Signals input from the touch panel or the physical keypad are conveyed to the controller unit 302, and the liquid crystal display unit displays the image data transmitted from the controller unit 302.

Figure 4:
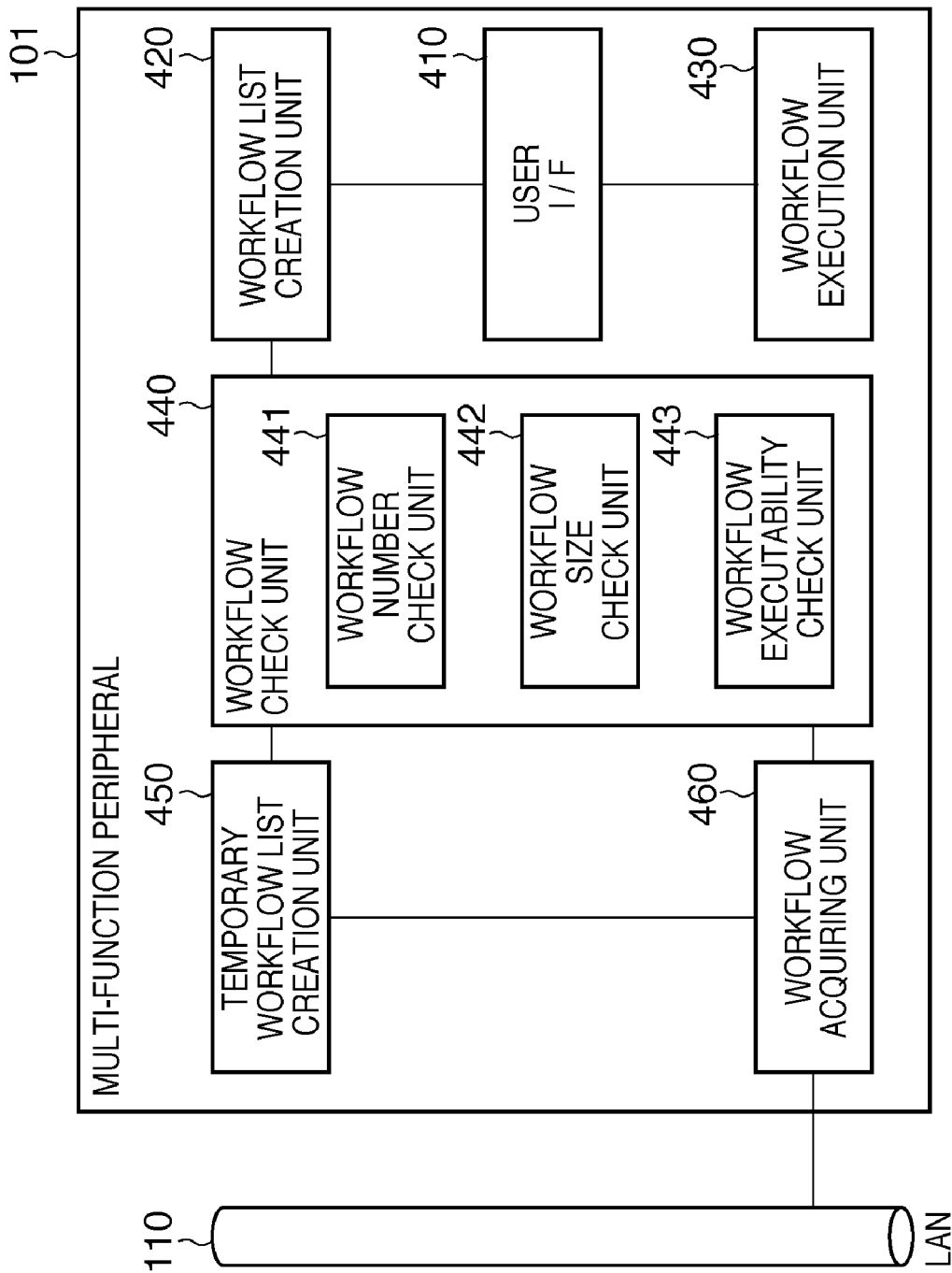
FIG. 4 is a diagram illustrating the functional configuration of a multi-function peripheral 101 when executing a software program.

FIG. 4 is a diagram illustrating a functional configuration of the multi-function peripheral 101 when executing a software program. A user interface 410 displays the status of the controller unit 302 on the operation unit 304, and receives instructions from users. For example, the user interface 410 receives instructions from a user to display a list of workflows stored in the HDD 305 of the multi-function peripheral 101, and instructions to execute a workflow. According to the instructions, the list of the workflows is displayed, and the workflow is executed.

When the instructions to display the list of the workflows are given, a workflow executability check unit 443, which is to be mentioned later, determines whether or not the workflow is executable, and the determination result is displayed in a fashion that is easy for a user to understand.

Figure 7:
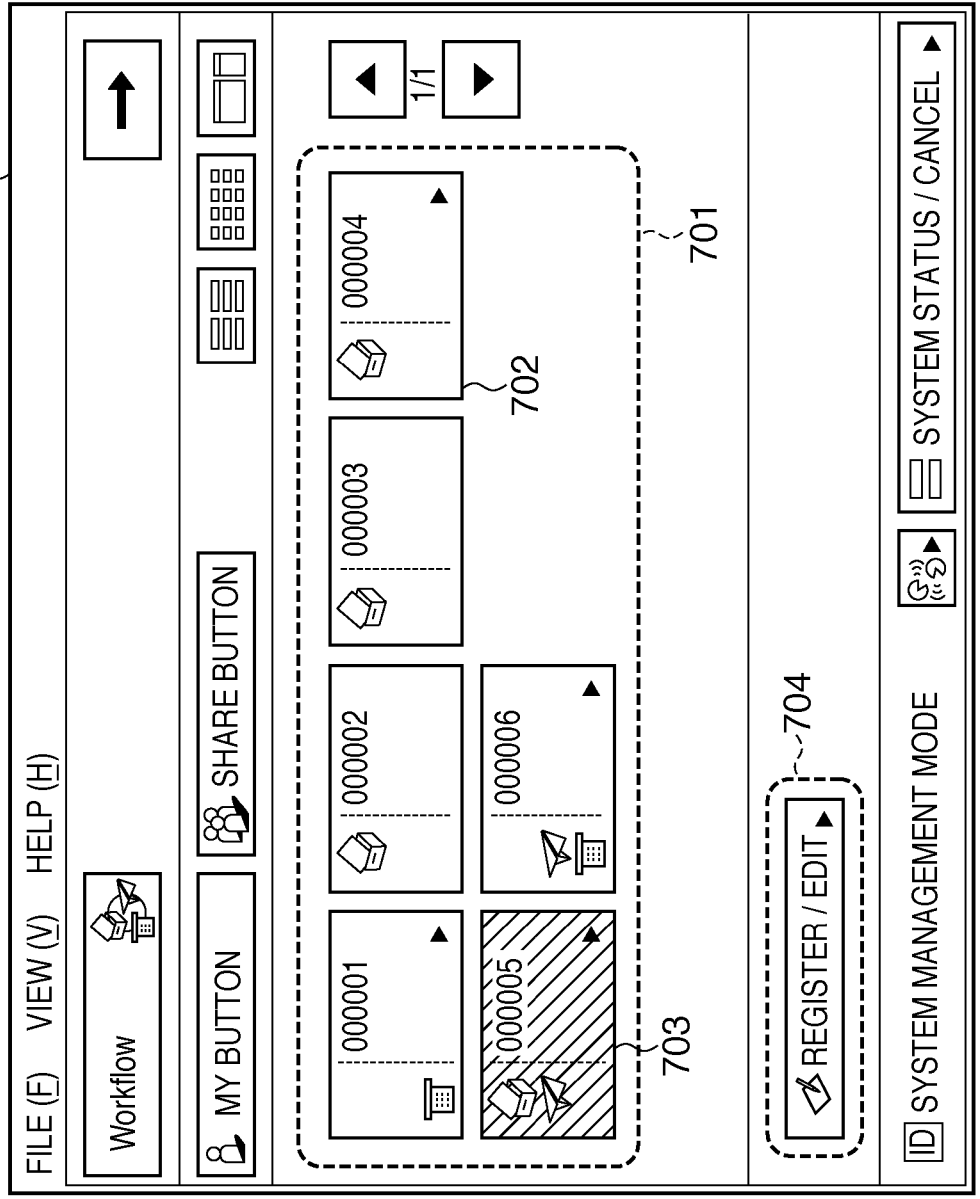
FIG. 7 is a diagram illustrating an example of a workflow list screen of an image forming apparatus.

The user interface 410 displayed on the operation unit 304 is realized, for example, by a list screen 700 as shown in FIG. 7. The list screen 700 is a screen in which a list of workflows stored (registered) in the HDD 305 of the multi-function peripheral 101 is displayed. Icons (buttons) that are corresponding to respective workflows are displayed for identifying the registered workflows. By selecting a button, a corresponding workflow is fetched and executed. The icons (buttons) are disposed in the list screen 700 as a workflow fetch button 701. Each button is displayed in a fashion such that inexecutable workflows and executable workflows can be identified visually based on the determination result of the workflow executability check unit 443, which shall be mentioned later. A button corresponding to a workflow that is determined as inexecutable by the workflow executability check unit 443 is, for example, displayed as an inexecutable button 703. Also, a button corresponding to a workflow that is determined as executable by the workflow executability check unit 443 is, for example, displayed as an executable button 702. The controller unit 302 and the user interface 410 function as a display control means that displays workflow executability in an identifiable manner.

The list screen 700 is configured of the executable buttons 702 and the inexecutable buttons 703. Inexecutable buttons are displayed as a gray-meshed button, so that users can identify the inexecutable buttons immediately. However, the list screen 700 is a screen used when executing workflows, and therefore when a register/edit button 704 is pressed to shift to a register/edit screen, the mesh for the button corresponding to the inexecutable workflow is canceled, and editing and deleting can be executed.

Although the gray-meshed button is used to display the button corresponding to the workflow determined as inexecutable in this embodiment, the configuration may be such that the button itself is hidden.

A workflow acquiring unit 460 acquires workflow execution data 502 registered in the multi-function peripheral 101 from the HDD 305, and acquires a workflow transmitted from the client PC 102 and the workflow server 103 via the LAN 110.

The workflow check unit 440 has a workflow number check unit 441 for checking the number of the workflows registered in the HDD 305 at a preset timing. The workflow check unit 440 also has a workflow size check unit 442 for checking the combined size and individual sizes of the registered workflows. The workflow check unit 440 also has a workflow executability check unit 443 for checking whether or not the registered workflows can be executed by the multi-function peripheral 101.

A preset timing is, for example, time when workflow editing or deletion is executed, and when an execution request of the workflow is received via the user interface 410. Another example of the preset timing is when receiving a workflow via the workflow acquiring unit 460 from the client PC 102 or the workflow server 103. Furthermore, another example of the preset timing is when an event notification has occurred along with a change in license status for the application in the multi-function peripheral 101. The preset timing also includes when an event notification occurred along with a change in the optional configuration of hardwares such as the original document paper-feeding unit and the ejection unit. The license status and the optional configuration are assumed to be stored in the controller unit 302.

A workflow list creation unit 420 creates a workflow list based on the check result of the workflow check unit 440; for example, a list such as that shown in FIG. 8. The list is configured of a workflow ID that functions as identification information for specifying the workflow, the size of the workflow, and information as to whether or not the workflow is currently in an executable state (executability determination information).

FIG. 13 is a workflow list used in a configuration of a model with a server to be described later. In addition to the workflow ID, the workflow size, and the information as to whether or not the workflow is currently in an executable state, the list includes information indicating where the execution data 502 is stored (the multi-function peripheral 101 or the workflow server 103).

A temporary workflow list creation unit 450 temporarily creates a workflow list after the import when the workflow acquiring unit 460 receives a workflow import request from outside, such as the client PC 102 or the workflow server 103. The temporary workflow list also has a similar configuration as the workflow list shown in FIG. 8 or FIG. 13.

Figure 5:
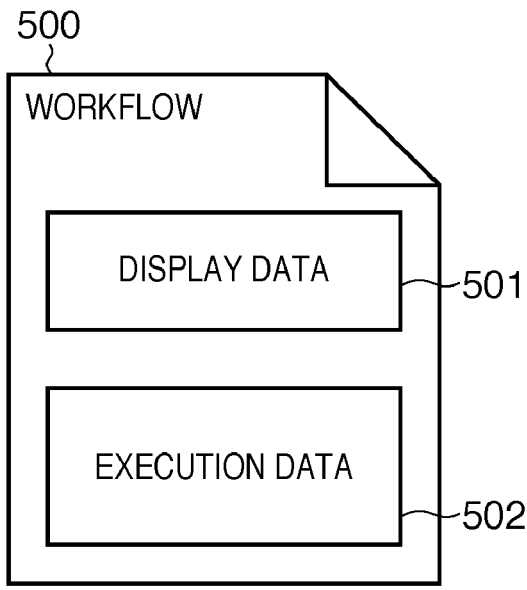
FIG. 5 is a diagram illustrating a basic configuration of a workflow.

FIG. 5 is a diagram illustrating a basic configuration of a workflow in this embodiment. A workflow, in this embodiment, is data in which how the functions to be executed by the multi-function peripheral are to be combined. The functions of the multi-function peripheral include roughly three, that is, "input", "edit", and "output". To be specific, the "input" function includes "scanning original document" and "selecting a document" that is stored in a box. The "edit" function includes "combining" a job or a document input by the functions of the above-described "input", "deleting a page", and "previewing". The "output" function includes "printing" a job or a document edited by the above-described "edit" functions, "transmitting", "storing in a box", and so on.

Combining functions means, for example, combining, using the "combine" function, a document scanned using the function of "scanning an original document" and a document in a box selected using the function of "selecting a document". Furthermore, in combining functions, functions are freely designated from the above-described functions of the multi-function peripheral and recorded as a workflow, for example, printing the combined document using the "printing" function, and transmitting using the "transmitting" function.

A workflow 500 shown in FIG. 5 is created by the workflow list creation unit 420, and configured of display data 501 and execution data 502. The display data 501 is held in a memory, which is not shown. The display data 501 stores a list of the workflow ID, the workflow name, the workflow size, and the functions to be used in the workflow (the above-described functions of the multi-function peripheral), in addition to the hardware options to be used in the workflow. The display data 501 is used for displaying a list of workflows on the operation unit 304 and so on.

The execution data 502 stores functions used in the workflows and detailed setting values for each function, and each function is arranged in the order of execution. The detailed setting values include, for example, for the function of "scanning original document", information indicating settings related to color modes such as full color/black and white, and information indicating whether or not designating enlargement/reduction is possible at the time of reading.

"Executing a workflow" means that a workflow execution unit 430 analyzes information stored in the workflow, fetches, in the order of the functions stored, the detailed settings values that are recorded, and sequentially executes those functions.

The functions to be combined in the workflow are at least one or more, and the configuration can be made so as to fetch a function belonging to a device other than the multi-function peripheral. The function of executing the workflow refers to fetching the function as recorded in the execution data 502, and executing the function.

Figure 6:
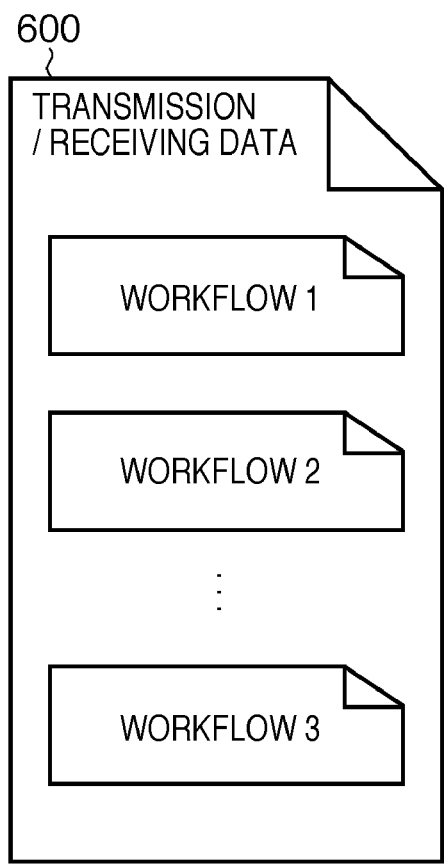
FIG. 6 is a diagram illustrating a exemplary configuration of basic transmission/receiving data when a multi-function peripheral 101, a client PC 102, and a workflow server 103 handle a workflow via a LAN 110.

FIG. 6 is a diagram illustrating an exemplary configuration of basic transmission/receiving data when the multi-function peripheral 101, the client PC 102, and the workflow server 103 handle a workflow via the LAN 110. It has already been described that one workflow includes the display data 501 and the execution data 502. The transmission/receiving data 600 includes at least one or more, that is, a plurality of workflows 500.

The workflow list creation unit 420 of the multi-function peripheral 101 creates an arbitrary workflow assigned by the client PC in accordance with an export request from the client PC 102, consolidates the workflow in one file as the transmission/receiving data 600, and transmits the file. Also, when the multi-function peripheral 101 transmits a workflow to the workflow server 103, transmission/receiving data 600 is created, and transmitted from the workflow acquiring unit 460 to be mentioned later via the LAN 110.

Because it is assumed that the transmission/receiving data is handled with SwA (SOAP with Attachments) format using the HTTP protocol, such a file format is used. The data format, protocol, or the like is not particularly limited, as long as the format or data is recognizable among devices in which the workflow is handled.

Figures 10, 11:
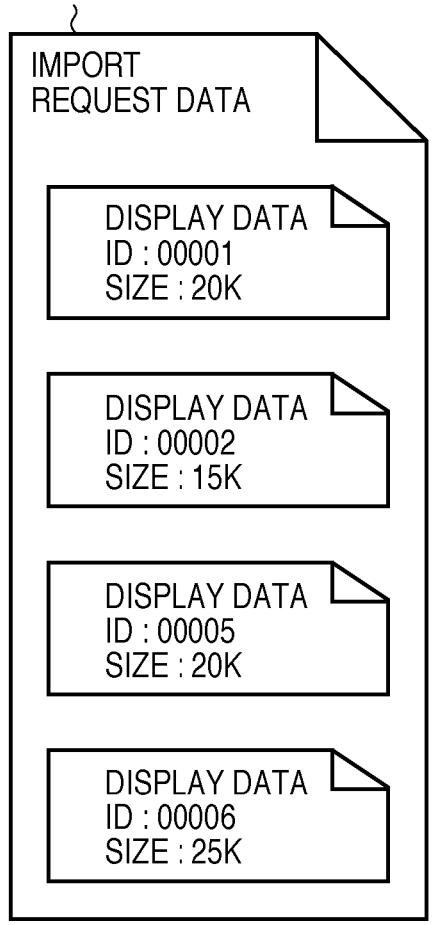
FIG. 10 is a diagram illustrating an example of import request data.
FIG. 11 is a diagram illustrating an example of a temporary workflow list.

FIG. 10 is a diagram illustrating an example of import request data. The import request data is data used when making an inquiry as to whether or not the desired data is importable before the transmission/receiving data 600 as shown in FIG. 6 is transmitted. The import request data is configured only from the display data 501, which is a part of the workflow 500. The client PC 102 transmits an import request to the multi-function peripheral 101 by using import request data 1001. When the result of the analysis performed by the multi-function peripheral 101 that received the import request data indicates that it is importable, the client PC 102 then creates the transmission/receiving data 600, and executes the import. Although a transmission of one file using SwA is assumed for the import request data, similarly to the case of the transmission/receiving data 600, the format, protocol, or the like of the data is not particularly limited, as long as the format or data is recognizable among devices in which the workflow is handled.

(Processing in First Configuration Example (Serverless Model))

Figure 9:
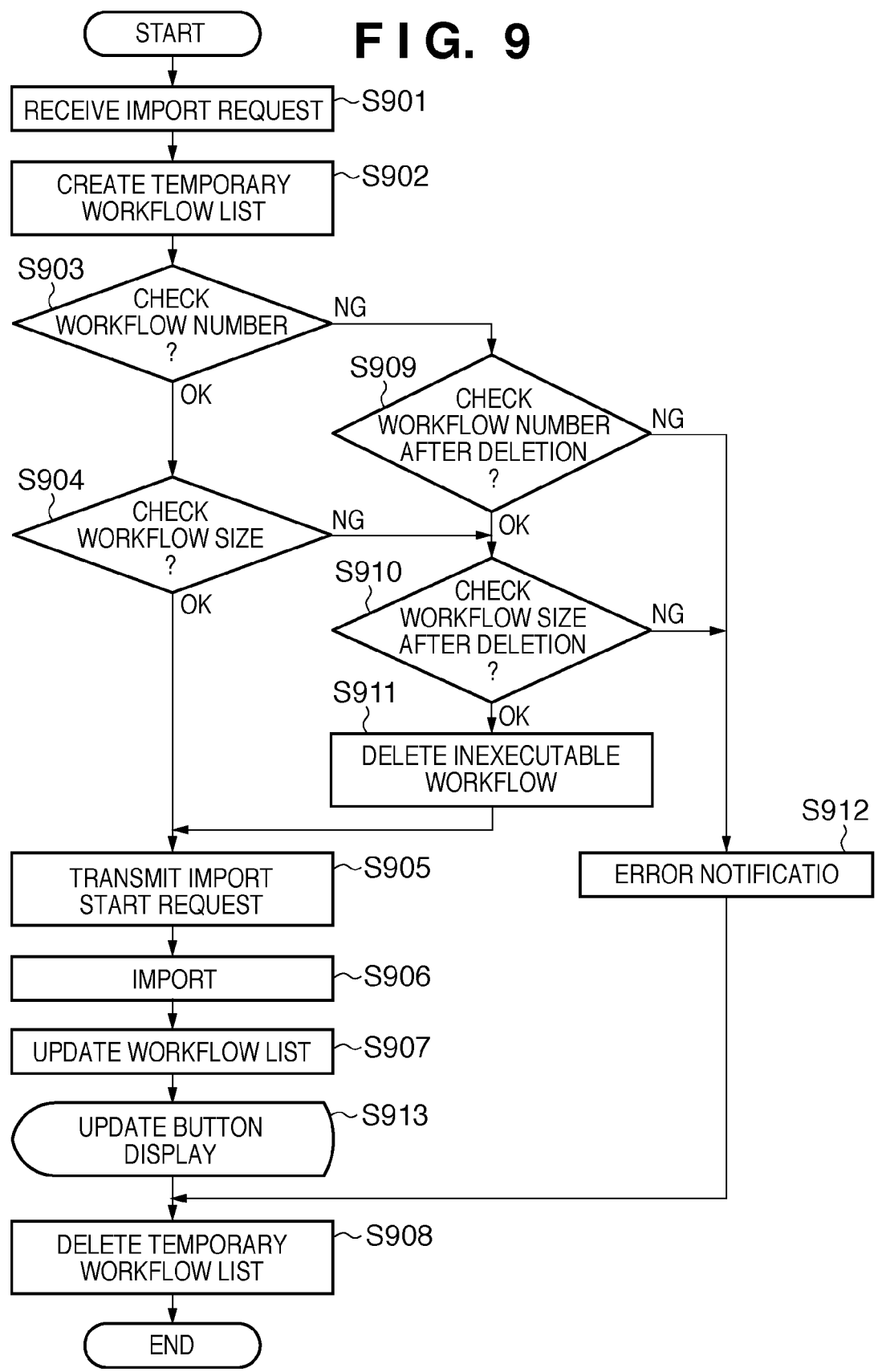
FIG. 9 is a flowchart illustrating a flow of data processing in an image forming apparatus included in an image forming system of the first exemplary configuration.

A data processing flow in an image forming apparatus included in an image forming system of the first exemplary configuration described in FIG. 1 is described with reference to the flowchart in FIG. 9.

In step S901, the multi-function peripheral 101 receives a workflow import request from the client PC 102. It is assumed that a file (for example, import request data 1001 as shown in FIG. 10) configured only from display data of a workflow that the user wishes to import is attached to the data transmitted from the client PC 102. Although not shown, in the display data, a list of functions used, information on hardware options used, and the like are also stored. Although communication via SOAP message using the HTTP protocol is assumed in this embodiment, the communication means is not limited thereto.

In step S902, when the workflow acquiring unit 460 receives the display data of the workflow requested in step S901, the temporary workflow list creation unit 450 creates a temporary workflow list based on the display data.

For example, when the already-created workflow list has content like the one shown in FIG. 8 at this time, and an import request with the import request data 1001 of FIG. 10 is received, the temporary workflow list will become similar to that shown in FIG. 11.

When a workflow having the same ID as that of the workflow ID recorded in the import request data 1001 is stored in the HDD 305, the workflow in the HDD 305 is overwritten when the import processing is completed by receiving the transmission/receiving data 600. The workflow having a different workflow ID is added to the HDD 305 as a new workflow. In the case of FIG. 11, the data 1101, 1102, and 1103 having the same flow IDs with those in the workflow ID are overwritten. The data 1104, having a flow ID which is included only in the import request data 1001, is added as new data.

The temporary workflow list creation unit 450 creates a temporary workflow list by copying the workflow list of FIG. 8. Afterwards, the temporary workflow list creation unit 450 compares the workflow ID in the import request data 1001 and the workflow ID in the temporary workflow list (at this point, the contents of which are the same as that of the list of FIG. 8). Then, if a newly-added workflow ID is present in the import request data 1001, it is added to the flow ID column in the temporary workflow list.

Figure 15:
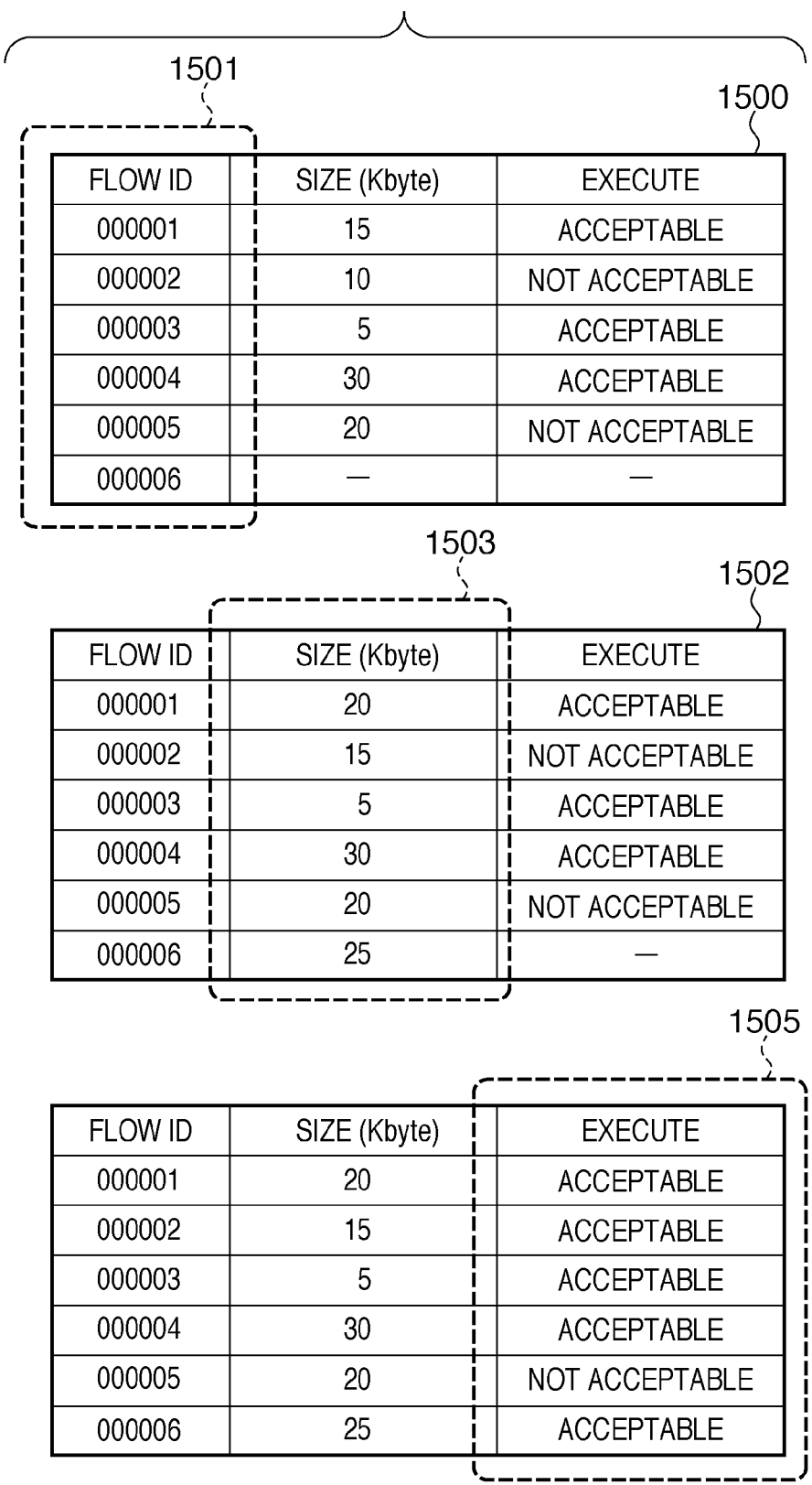
FIG. 15 is a diagram illustrating a process in which a workflow list is created at the time of importing workflows.

The status at this time corresponds to 1500 in FIG. 15. The workflow ID 000006 is added to a flow ID column 1501. Next, referring to a workflow size of respective display data in the import request data, a size column in correspondence with the workflow ID in the temporary workflow list 1500 is updated with reference to the size that was referred to. The status at this time corresponds to 1502 in FIG. 15. As can be seen, a size column 1503 of the workflow IDs 000001, 000002, and 000006 is updated.

Next, the workflow executability check unit 443 refers to a list of applications to which the functions to be used belong, among the plurality of functions of the multi-function peripheral 101, and to a list showing the hardware configuration (hardware option list), the list being stored in respective display data. The workflow executability check unit 443 compares the application list and the hardware option list against information indicating application license settings and hardware operation status stored in the controller unit 302. The workflow executability check unit 443 determines, for example, whether or not the license settings are in a state that allows the application to be executed, and whether or not the hardware configuration (hardware option) is properly operating and can be used. The workflow executability check unit 443 determines, when the license has been expired, that the functions using the corresponding application are inexecutable. The workflow executability check unit 443 also determines, when the hardware option is not properly operating, that the functions using the corresponding hardware option are inexecutable. The workflow executability check unit 443 functions as an executability determination unit that determines whether or not the workflow corresponding to the display data is executable.

Then, the workflow executability check unit 443 updates the column of determination results of executability corresponding to the respective workflow IDs based on the comparison results. The status at this time corresponds to executability determination result column 1505 in FIG. 15. It can be seen that the executabilities of the workflow IDs 000002 and 000006 are updated. For example, in the workflow ID 000002, because the workflow is edited in the client PC 102, and the functions to be used and the hardware option are changed, the status has been changed from inexecutable to executable. The temporary workflow list (FIG. 11) is created by the processing as described above.

In step S903, the workflow number check unit 441 checks whether or not the upper limit of the workflow number that can be registered in the multi-function peripheral 101 is exceeded based on the temporary workflow list created in step S902. If the upper limit of the number of workflows that can be registered is exceeded, the process moves to S909, and if the upper limit of the number of workflows that can be registered is not exceeded, the process moves to S904.

In step S904, the workflow size check unit 442 checks whether or not the upper limit of the workflow size that can be registered in the HDD 305 of the multi-function peripheral 101 is exceeded. If the upper limit of the workflow size that can be registered is exceeded, the process moves to S910, and if the upper limit of the workflow size that can be registered is not exceeded, the process moves to S905. The workflow number check unit 441 and the workflow size check unit 442 function as a registration availability determination unit that re-determines whether or not the workflow included in the temporary workflow list can be registered based on the number and the data size of the workflows.

In step S905, an import start request is transmitted to the client PC 102 from the workflow acquiring unit 460.

In step S906, the workflow acquiring unit 460 of the multi-function peripheral 101 acquires import data (for example, transmission/receiving data as shown in FIG. 6) from the client PC 102. When the acquisition of the workflow is completed, in step S907, the existing workflow list is updated based on the acquired workflow. When the inexecutable workflow has not been deleted in the processing of step S911, the existing workflow list is updated based on the contents of the temporary workflow created in step S902. On the other hand, when the inexecutable workflow has been deleted in the processing of step S911, the existing workflow list is updated based on the temporary workflow list after the deletion of the inexecutable workflow.

When the existing workflow list has been updated, a display update request is output from the workflow list creation unit 420 to the user interface 410. In step S913, the user interface 410 is updated to a display as shown in FIG. 7 according to the contents of the workflow list.

The workflow list creation unit 420 outputs a deletion request of the temporary workflow to the temporary workflow list creation unit 450 after outputting the update request of user interface display.

In step S908, the temporary workflow list creation unit 450 deletes the temporary workflow list, and the import processing ends.

At this time, the execution data is registered in the HDD 305 along with the executable workflow and the inexecutable workflow, and the inexecutable workflow is displayed with mesh, as the inexecutable button 703 of FIG. 7.

On the other hand, in step S909, the workflow number check unit 441 calculates the workflow number excluding the inexecutable workflow ID 000005 in the temporary workflow list, and checks whether or not the upper limit of the workflow number that can be registered is exceeded.

If the determination in step S909 indicates that the upper limit of the workflow number that can be registered is not exceeded, the process moves to S910.

In step S910, the workflow size check unit 442 checks whether or not the total size of the workflow excluding the inexecutable workflow ID 000005 exceeds the upper limit size for the registration.

If the determination in step S910 indicates that the upper limit size for the registration is not exceeded, the workflow size check unit 442 deletes inexecutable workflow ID 000005 from the HDD 305, and the process moves to step S905. Steps S905 to S908 are the same processing procedures as described above. In this case, when transmitting the import start request to the client PC in step S905, the client PC is notified to import only workflow ID 000001, 000002, and 000006, excluding inexecutable workflow ID 000005.

When it is determined that the import cannot be carried out even though the inexecutable workflows were deleted in S909 and S910, the workflow number check unit 441 and the workflow size check unit 442 notify the client PC 102 of an error (S912). The processing in FIG. 9 is thus completed.

(Processing when there is a Change in the Status of a Workflow after Completing the Import)

Figure 16:
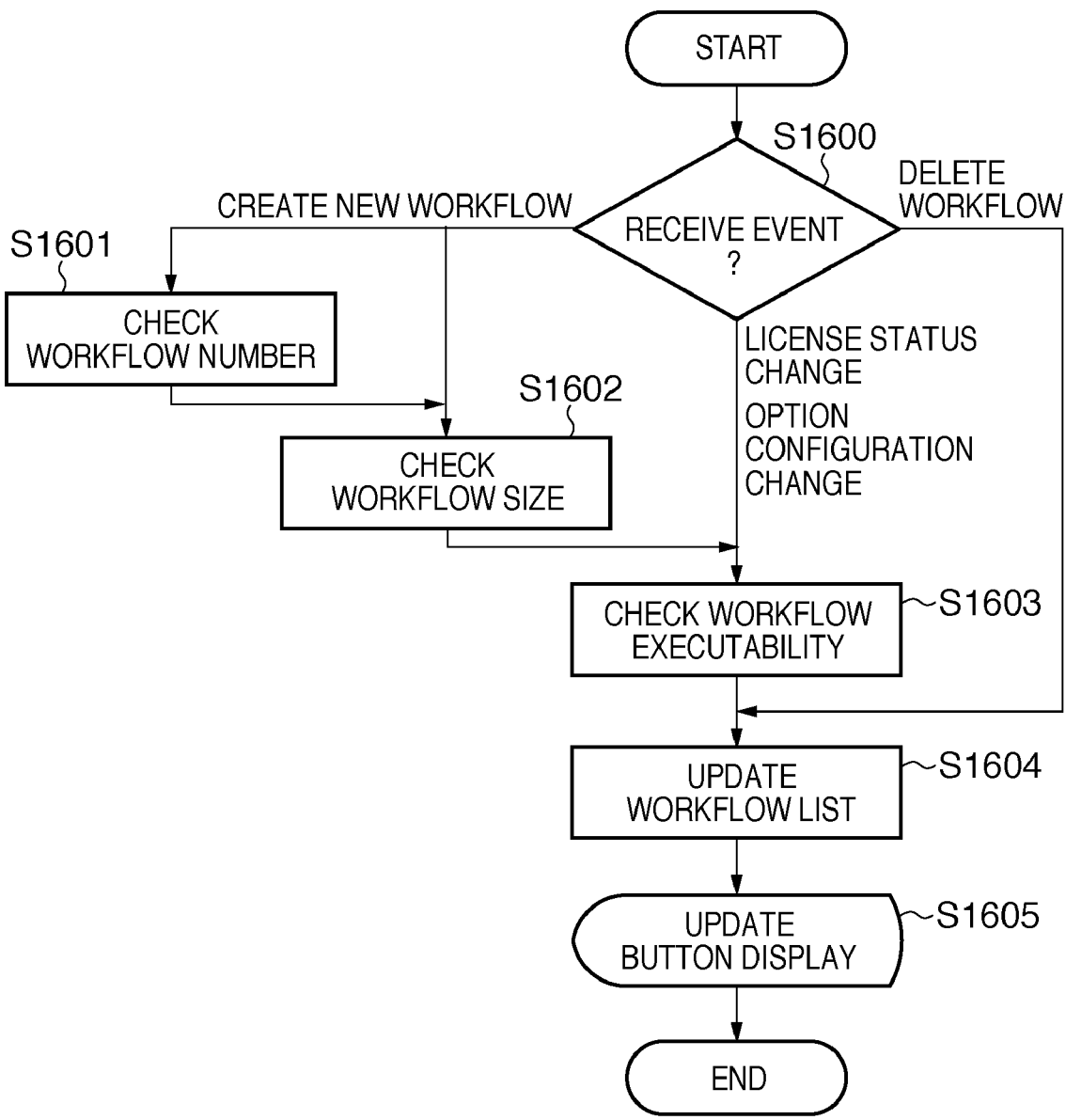
FIG. 16 is a flowchart illustrating a flow of processing when there is a change in a status relating to workflows after completing the import.

The processing when there is a change in a status of a workflow after completion of the import in the processing of the first exemplary configuration (serverless model) is described using the flowchart of FIG. 16. Because the processing will be the same as the processing in FIG. 9 when there is an import request again, to avoid redundancy, descriptions thereof are omitted.

In step S1600, the workflow list creation unit 420 receives notification of a status change (receives an event). When there is a change in the license settings for applications for executing functions or in information indicating hardware operation status, the workflow list creation unit 420 receives an event from a license management unit or an option configuration management unit (not shown). Also, when new creation/editing or deletion is carried out for a workflow in the user interface 410, notification corresponding to the processing is issued.

For example, when a workflow is deleted, a notification indicating the deletion and the deleted workflow ID is issued. When a workflow is newly created, a notification indicating that a workflow is newly created, and the display data 501 is issued. When a workflow is edited, a notification indicating the fact that the workflow is edited and the display data 501 is issued. When newly creating/editing a workflow, the newly created/edited workflow data is held in a memory, which is not shown, and not registered in the HDD 305.

When the workflow is deleted, the process moves to step S1604, and the workflow list creation unit 420 deletes the list corresponding to the workflow ID, and updates the workflow list.

When the status change notification is given from the license management unit or the option management unit, which is not shown, the process moves to S1603. The workflow executability check unit 443 checks workflow executability, comparing the functions of each workflow and the option list held in the memory against the license settings and the option status. The workflow list creation unit 420 updates the execution column of the workflow list in FIG. 11 in step 1604 based on the determination results of the workflow executability check.

When the workflow has been edited, the process moves to S1602. The workflow size check unit 442 checks whether or not the upper limit of the workflow size is exceeded based on the workflow size on the display data 501. The processing from then on is the same processing as the above-described processing at the time of license/option status change.

When a workflow is newly created, the process moves to S1601. The workflow number check unit 441 checks whether or not the upper limit of the workflow number is exceeded based on the display data 501. The processing afterwards is the same as the above-described processing at the time of editing the workflow.

As described above, after appropriate processing is executed according to the types of the event notified and the workflow list is updated, in step S1605, the user interface 410 displays the content according to the latest workflow list content.

That is, the button corresponding to the deleted workflow is deleted, and the mesh of the button corresponding to the workflow whose status has been changed from inexecutable to executable is removed, switching the button to a state where users can execute the workflow, as with the executable button 702. On the other hand, the button corresponding to the workflow whose status has been changed from executable to inexecutable is meshed, switching to a state where users cannot execute the workflow, as with the inexecutable button 703.

In step S1601 and S1602 of the flowchart in FIG. 16, when the workflow number is exceeded, or the workflow size is exceeded, the workflow list and the button display are not updated, and the processing ends.

(Processing in Second Configuration Example (Model with Server))

Figure 12A:
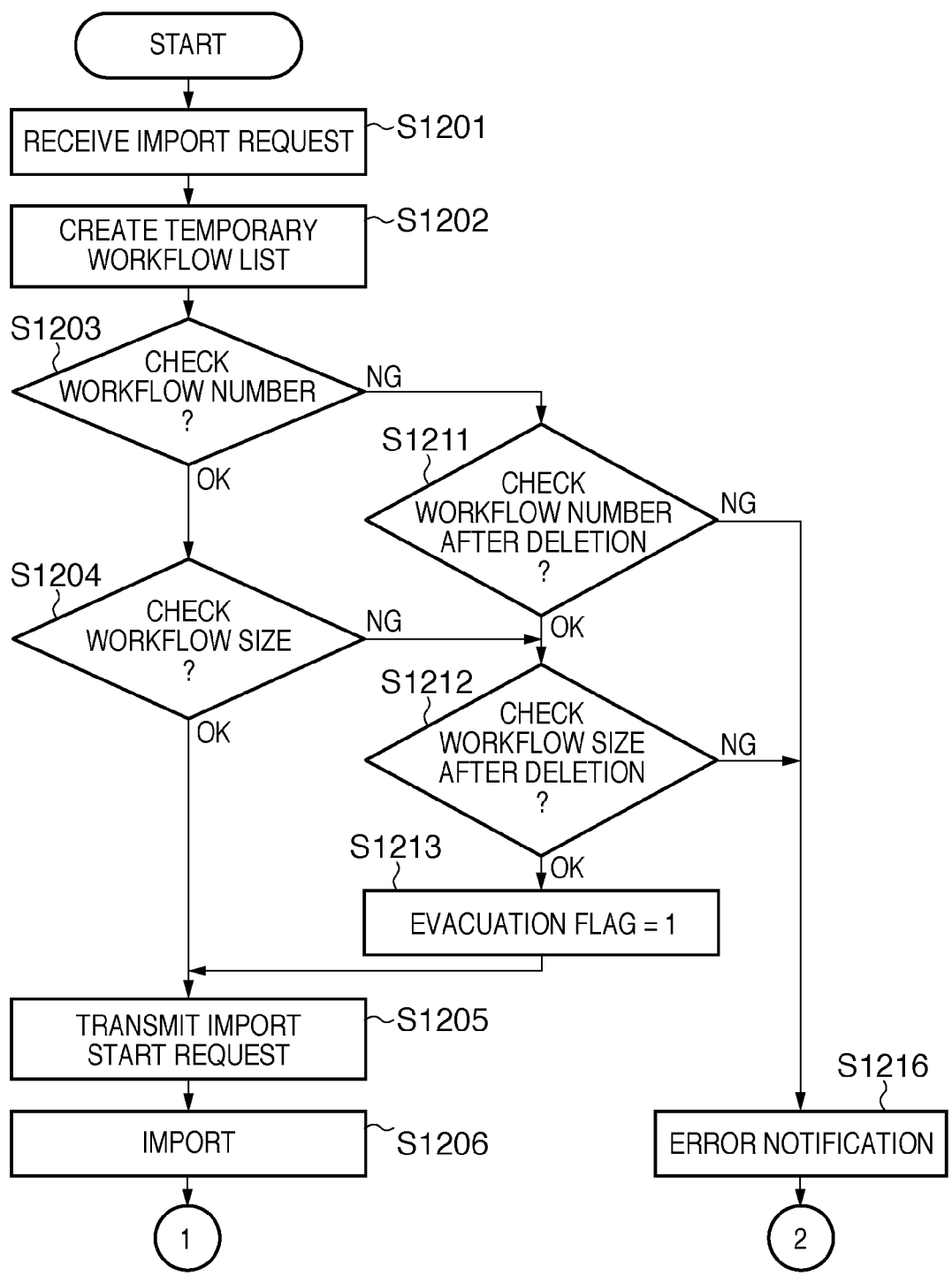
FIGS. 12A and 12B are flowcharts illustrating a flow of a data processing method in an image forming apparatus included in an image forming system of the second exemplary configuration.
Figure 12B:
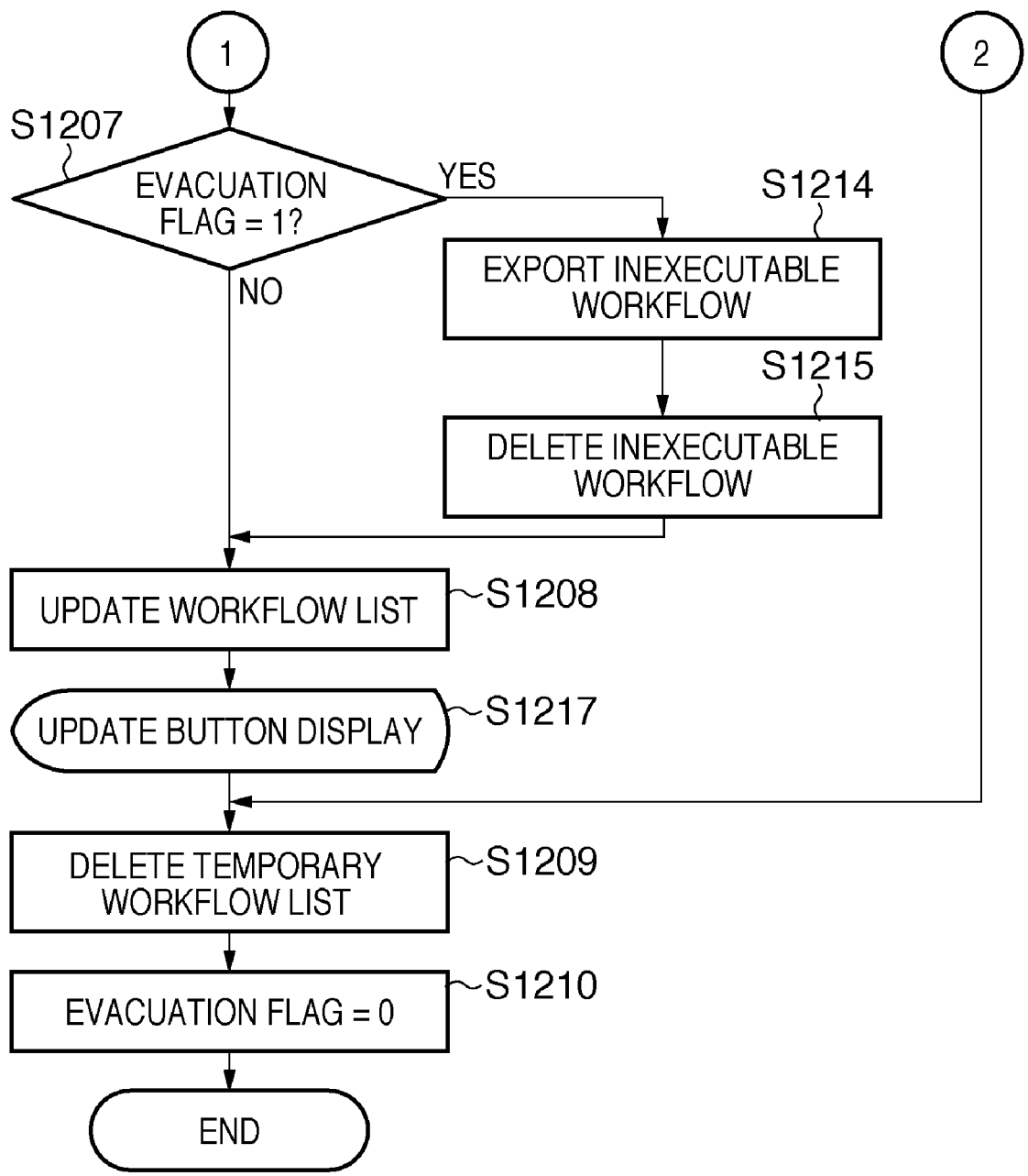

A flow of data processing method in an image forming apparatus included in an image forming system of the second exemplary configuration described in FIG. 2 is described with reference to the flowchart in FIGS. 12A and 12B.

In step S1201, the multi-function peripheral 101 receives a workflow import request from the client PC 102. It is assumed that a file (for example, import request data 1001 as shown in FIG. 10) configured only from display data of a workflow that a user wishes to import is attached to the data transmitted from the client PC 102. Although not shown, in the display data, a list of functions used (applications), information on hardware options used, and the like are also stored. Although communication via SOAP message using the HTTP protocol is assumed in this embodiment, the communication means is not limited thereto.

In step S1202, when the workflow acquiring unit 460 receives the display data of the workflow requested in step S1201, the temporary workflow list creation unit 450 creates a temporary workflow list based on the display data.

For example, when the already-created workflow list has content like the one shown in FIG. 13 at this time, and an import request with the import request data 1001 of FIG. 10 is received, the temporary workflow list will become similar to that shown in FIG. 14.

When there is a workflow with the same flow ID, it is overwritten, and a workflow with a new flow ID is added. Additionally, even if the workflow has the same flow ID, depending on the workflow editing, there may be a change in executability or size. For example, workflow ID 000001, workflow ID 000002, and workflow ID 000005 are present in the current workflow list (FIG. 13), and therefore they are overwritten. The workflow sizes of workflow ID 000001 and workflow ID 000005 are updated; the workflow size and executability of workflow ID 000002 are updated; and workflow ID 000006 is newly added (FIG. 14). The workflow executability check unit 443 compares the application list and the hardware option list in the display data contained in the import request data, against the license status and the option configuration stored in the controller unit 302. That is, the temporary workflow list of FIG. 14 shows a temporary status with all the workflows imported.

In step S1203, the workflow number check unit 441 checks whether or not the upper limit of the workflow number that can be registered in the multi-function peripheral 101 is exceeded based on the temporary workflow list created in step S1202.

If the upper limit of the number of workflows that can be registered is not exceeded, the process moves to step S1204.

In step S1204, the workflow size check unit 442 checks whether or not the upper limit of the workflow size that can be registered in the HDD 305 of the multi-function peripheral 101 is exceeded.

If the upper limit of the workflow size that can be registered is not exceeded, the process moves to S1205.

In step S1205, an import start request is transmitted to the client PC 102 from the workflow acquiring unit 460.

In step S1206, the workflow acquiring unit 460 of the multi-function peripheral 101 receives import data (for example, transmission/receiving data as shown in FIG. 6) from the client PC 102. When the import of the workflow is completed, in step S1207, it is checked whether or not an evacuation flag, to be mentioned later, is set. When the evacuation flag is not set, the process moves to S1208.

In step S1208, the workflow list is updated based on the contents of the temporary workflow created in step S1202. When the workflow list has been updated, a display update request is output from the workflow list creation unit 420 to the user interface 410. In step S1217, the user interface 410 is updated to a display as shown in FIG. 7 according to the contents of the workflow list.

The workflow list creation unit 420 outputs a deletion request of the temporary workflow to the temporary workflow list creation unit 450 after outputting the update request of user interface display.

In step S1209, the temporary workflow list creation unit 450 deletes the temporary workflow list; the evacuation flag is cleared in step S1210; and the import processing ends. At this time, the execution data is registered in the HDD 305 along with the executable workflow and the inexecutable workflow, and the inexecutable workflow is displayed with mesh, as the inexecutable button 703 of FIG. 7.

On the other hand, when the workflow number exceeded the upper limit in the determination in step S1203, the process moves to S1211.

In step S1211, the workflow number check unit 441 calculates the workflow number excluding the inexecutable workflow ID 000005 in the temporary workflow list, and checks whether or not the upper limit of the workflow number that can be registered is exceeded.

If the determination in step S1211 indicates that the upper limit of the workflow number that can be registered is not exceeded, the process moves to step S1212.

In step S1212, the workflow size check unit 442 checks whether or not the total size of the workflow excluding the inexecutable workflow ID 000005 exceeds the upper limit size for the registration.

If the determination in step S1212 indicates that the upper limit size for the registration is not exceeded, the workflow size check unit 442 transmits the workflow specified by inexecutable workflow ID 000005 to the workflow server 103.

In step S1213, the workflow size check unit 442 sets the evacuation flag (=1) indicating that the execution data of the inexecutable workflow has been transmitted to the workflow server 103 and evacuated from the multi-function peripheral 101.

When a plurality of workflow servers corresponding to the workflow server 103 are present in the image forming system, information for specifying the place where the execution data of the workflow is evacuated is stored in the workflow list. By referring to the workflow list, in which workflow server the execution data of the workflow determined as inexecutable is stored can be specified. The evacuation flag is managed in the program code, but can be stored in the HDD 305 as well.

The multi-function peripheral 101 once receives the execution data for executing all the workflows from the client PC 102, but when the evacuation flag is set in the determination in step S1207, the process moves to step S1214.

In step S1214, the inexecutable workflows are all exported to the workflow server 103, and in step S1215, the execution data of the exported inexecutable workflows is deleted from the HDD 305.

In this embodiment, the configuration is such that the execution data of the inexecutable workflows is all exported, but the configuration may be such that the conditions for the export are something other than the executability, and a plurality of conditions are combined to narrow down the workflows to be exported. However, the display data of the inexecutable workflow is to be remained (stored) in the memory of the multi-function peripheral 101.

After the processing in step S1215, the process moves to step S1208, and the processing from step S1208 to step S1210 is the same as the above-described processing. However, in step S1208, with respect to the inexecutable workflow, the place where the workflow is stored is changed to the workflow server 103, and the workflow list is updated. The workflow list at this time is updated as storage place information 1801 in FIG. 18.

When it is determined that the import cannot be carried out even through the inexecutable workflows were deleted in S1211 and S1212, the workflow number check unit 441 and the workflow size check unit 442 notify the client PC 102 of an error (S1216). The processing in FIGS. 12A and 12B is thus completed.

(Restoration Processing of Evacuated Workflow)

Figure 17:
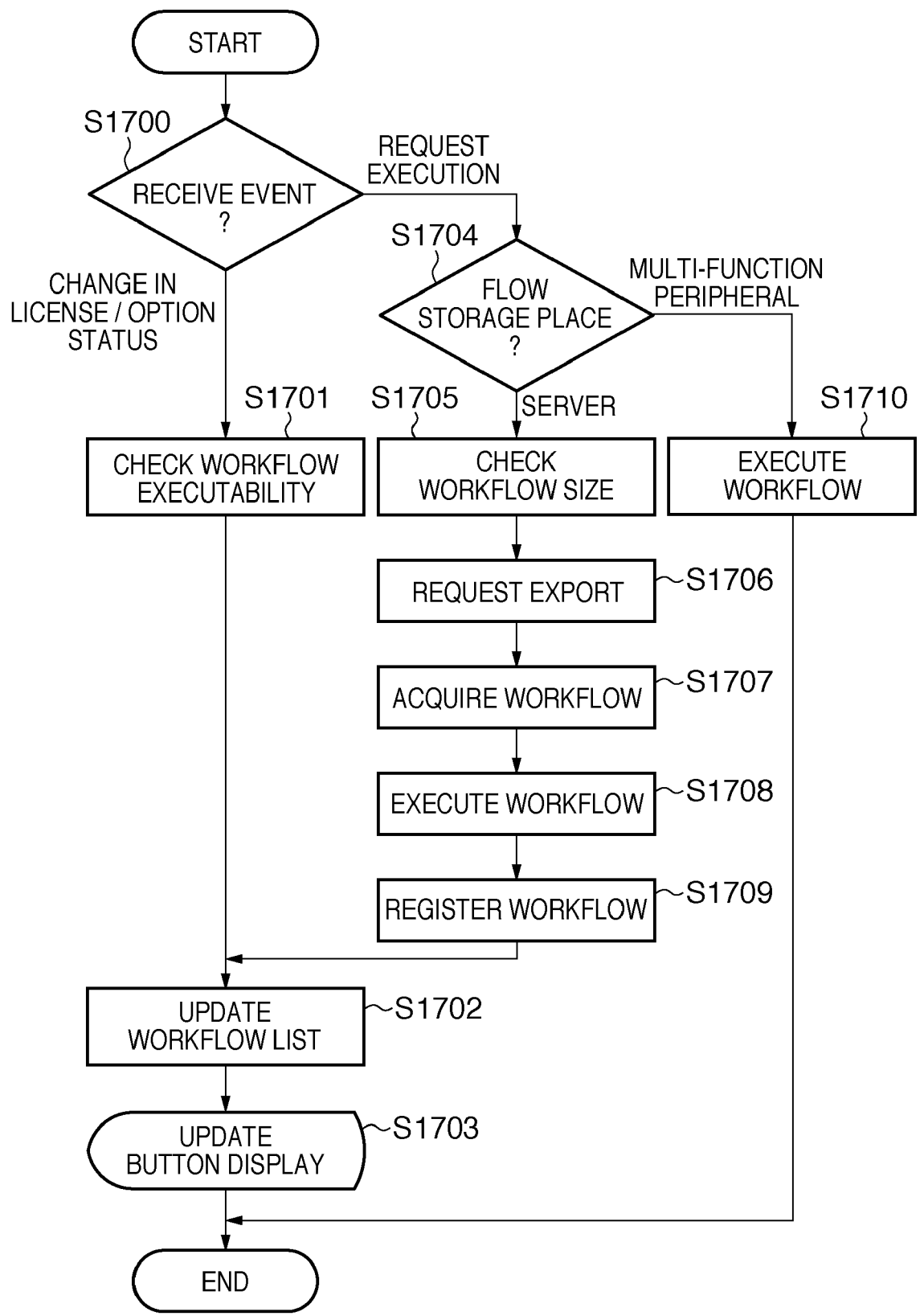
FIG. 17 is a flowchart illustrating a flow of processing for acquiring data for execution of a workflow that is evacuated to a workflow server.

Processing for acquiring the execution data of the workflow evacuated to the workflow server 103 in the second exemplary configuration of the image forming system (FIG. 2) is described with reference to the flowchart in FIG. 17 (restoration processing).

In step S1700, the workflow check unit 440 receives notification of status change from the license management unit or the option configuration management unit, which are not shown. The workflow check unit 440 determines whether the received status change notification is a workflow execution request or not, or a status change relating to changes in the application license or hardware options.

When it is determined that the notification was status change relating to the application license or hardware options, in step S1701, the workflow executability check unit 443 checks executability for all the workflows in the workflow list.

Then, in step S1702, the workflow list creation unit 420 updates the workflow list according to the check result of the workflow executability.

In step S1703, the user interface 410 removes, for example, the mesh of the inexecutable button 703, switching to the executable state for users when inexecutable workflow ID 000005 in FIG. 18 is changed to an executable workflow. Display of the inexecutable button 703 is switched to the executable button 702. Workflow IDs 000001 to 000006 are displayed as executable workflows, and the processing ends. At this time, the execution data of workflow ID 000005 remains stored (evacuated) in the workflow server 103.

When the event received in step S1700 is an execution request from the user interface 410, the process moves to S1704. It is assumed that the target workflow for an execution request (execution target workflow) has, for example, workflow ID 000005 as shown in FIG. 18, and the status has already been changed from the inexecutable state to the executable state at the point when the execution request is received.

In step S1704, the workflow executability check unit 443 refers to the workflow list, and confirms the area where the execution data of workflow ID 000005 is stored.

When the area of storage is the workflow server 103, the process moves to step S1705.

In step S1705, the workflow size check unit 442 checks whether or not there is enough space for the execution data of workflow ID 000005 to be registered in the HDD 305, before issuing an export request of workflow ID 000005. As long as the registration in the HDD 305 is possible, the process moves to step S1706. On the other hand, when it is determined that the registration in the HDD 305 is not possible, the workflow size check unit 442 notifies the client PC 102 of the fact that workflow ID 000005 cannot be executed (S1711).

In step S1706, the workflow acquiring unit 460 requests an export of the execution data of workflow ID 000005 to the workflow server 103.

In step S1707, when the workflow acquiring unit 460 receives the execution data of workflow ID 000005, the execution data of workflow ID 000005 is temporarily expanded in the memory.

Then, in step S1708, the workflow execution unit 430 fetches functions stored in the execution data 502, and the functions of workflow ID 000005 are executed. When the execution of the functions of workflow ID 000005 is completed, the data expanded in the memory is deleted.

In step S1709, the execution data is registered in the HDD 305. In step S1702, the workflow list creation unit 420 changes the storage place of the execution data of workflow ID 000005 from the workflow server 103 to the multi-function peripheral 101, and updates the workflow list.

On the other hand, when the storage place of the execution data of workflow ID 000005 is the multi-function peripheral 101 as a result of the determination in step S1704, the process moves to step S1710, the specified workflow is executed, and then the processing ends.

In step S1700, when the workflow check unit 440 has determined that there is enough space in the workflow size for registration at a preset timing, even if there is no execution request, the processing after step S1706 can also be started. For example, the workflow listed in an upper rank of the workflow list, and a workflow with a small execution data size are prioritized and their execution data are acquired from the workflow server 103, registered in the HDD 305, and then the workflow list can be updated.

According to this embodiment, even in the case where the capacity of the storage region is insufficient, by excluding the inexecutable workflow from the import target, the workflow import can be carried out efficiently.

Or, when in an executable state by a status change in the license settings and the like, by using data evacuated to the outside, without registering the workflow again, execution of the desired workflow is possible, improving usability.

Other Embodiments

Furthermore, it goes without saying that the object of the present invention can also be achieved by supplying, to a system or apparatus, a computer-readable storage medium in which the program code for software that realizes the functions of the aforementioned embodiment has been stored, and causing a computer (CPU or MPU) of the system or apparatus to read out and execute the program code stored in the storage medium.

In such a case, the program code itself read out from the computer-readable storage medium implements the functionality of the aforementioned embodiment, and the storage medium in which the program code is stored composes the present invention.

Examples of a storage medium for supplying the program code include a flexible disk, a hard disk, an optical disk, a magneto-optical disk, a CD-ROM, a CD-R, a non-volatile memory card, a ROM, and so on.

Moreover, it goes without saying that the following case also falls under the scope of the present invention, which is not limited to implementing the functions of the aforementioned embodiment by a computer executing the read-out program code. That is, the case where an operating system (OS) or the like running in a computer performs part or all of the actual processing based on instructions in the program code, and the functionality of the aforementioned embodiment is realized by that processing, is included in the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-042065, filed Feb. 22, 2008, which is hereby incorporated by reference herein in its entirety.

What is claimed is:

1. An image forming apparatus comprising:
a receiving unit adapted to receive, for determining whether or not a workflow specifying processing to be executed by a combination of a plurality of functions can be registered, import request data including the number of workflows transmitted from a client, the data size for executing the workflow, and a list of applications for executing the workflow,
an executability determination unit adapted to determine whether or not the processing specified in the workflow is executable by comparing the list of applications against information indicating license settings of the applications stored in advance,
a creation unit adapted to create a temporary workflow list in which the data size and determination results of the executability determination unit are listed in correspondence with respective workflows,
a registration availability determination unit adapted to determine whether or not an upper limit on the number of workflows and the data size that can be registered is exceeded based on the number of workflows and the data size included in the temporary workflow list,
an acquiring unit adapted to acquire, from the client, execution data for executing respective workflows and display data for controlling display of a display unit included in the temporary workflow list and to register the data when the registration availability determination unit has determined that the data can be registered, and
a display control unit adapted to display executable workflows and inexecutable workflows on the display unit in such a fashion that the executable workflows and the inexecutable workflows are identifiable based on the display data acquired by the acquiring unit.

2. The image forming apparatus according to claim 1, wherein when the registration availability determination unit has determined that the workflow included in the temporary workflow list cannot be registered, the registration availability determination unit deletes the inexecutable workflow determined as inexecutable by the executability determination unit from the temporary workflow list, and re-determines whether or not the registration is possible.

3. The image forming apparatus according to claim 2, wherein when the registration availability determination unit has determined by the re-determination that the registration is possible, the acquiring unit acquires the execution data for executing the executable workflow included in the temporary workflow list after the inexecutable workflow is deleted from the temporary workflow list and the display data from the client.

4. The image forming apparatus according to claim 2, further comprising a setting unit adapted to set, when the registration availability determination unit has determined by the re-determination that the registration is possible, a flag indicating the determination result,
wherein the acquiring unit transmits the execution data corresponding to the inexecutable workflow acquired from the client to a server to evacuate the execution data when the flag has been set by the setting unit.

5. The image forming apparatus according to claim 1, further comprising an update unit adapted to update the workflow list created in advance based on the execution data for executing the workflow and the display data for controlling display of the display unit acquired by the acquiring unit.

6. The image forming apparatus according to claim 1, further comprising an event receiving unit adapted to receive a change in the license settings of an application, a creation of a new workflow, editing of a workflow, an execution request of a workflow as an event of status change,
wherein the executability determination unit determines whether or not the workflow after the status change is executable when the event receiving unit has received an event of the status change.

7. The image forming apparatus according to claim 6, further comprising a confirmation unit adapted to confirm if a storage area for the execution data of the workflow to be executed is in the server or in the image forming apparatus when the event receiving unit has received an execution request of a workflow,
wherein when the confirmation unit has confirmed that the execution data is stored in the server, the acquiring unit acquires execution data of the workflow to be executed from the server, and the display control unit switches the display for the workflow to be executed from the display for the inexecutable workflow to the display for the executable workflow.

8. A data processing method in an image forming apparatus, the method comprising:
a receiving step of receiving, for determining whether or not a workflow specifying processing to be executed by a combination of a plurality of functions can be registered, import request data including the number of workflows transmitted from a client, the data size for executing the workflow, and a list of applications for executing the workflow,
an executability determination step of determining whether or not the processing specified in the workflow is executable by comparing the list of applications against information indicating license settings of the applications stored in advance,
a creation step of creating a temporary workflow list in which the data size and determination results of the executability determination step are listed in correspondence with respective workflows,
a registration availability determination step of determining whether or not an upper limit on the number of workflows and the data size that can be registered is exceeded based on the number of workflows and the data size included in the temporary workflow list,
an acquiring step of acquiring, from the client, execution data for executing respective workflows and display data for controlling display of a display unit included in the temporary workflow list and registering the data when it has been determined that the data can be registered in the registration availability determination step, and
a display control step of displaying executable workflows and inexecutable workflows on the display unit in such a fashion that the executable workflows and the inexecutable workflows are identifiable based on the display data acquired in the acquiring step.

9. The data processing method according to claim 8, wherein when it has been determined in the registration availability determination step that the workflow included in the temporary workflow list cannot be registered, the registration availability determination unit deletes the inexecutable workflow determined as inexecutable in the executability determination step from the temporary workflow list, and re-determines whether or not the registration is possible.

10. The data processing method according to claim 9, wherein when it has been determined by the re-determination in the registration availability determination step that the registration is possible, in the acquiring step, the execution data for executing the executable workflow included in the temporary workflow list after the inexecutable workflow is deleted from the temporary workflow list and the display data for controlling display of the display unit are acquired from the client.

11. The data processing method according to claim 9, further comprising a setting step of setting, when it has been determined by the re-determination in the registration availability determination step that the registration is possible, a flag indicating the determination result,
wherein in the acquiring step, the execution data corresponding to the inexecutable workflow acquired from the client is transmitted to a server to evacuate the execution data when the flag has been set in the setting step.

12. The data processing method according to claim 8, further comprising an update step of updating the workflow list created in advance based on the execution data for executing the workflow and the display data for controlling display of the display unit acquired in the acquiring step.

13. The data processing method according to claim 8, further comprising an event receiving step of receiving a change in the license settings of an application, a creation of a new workflow, editing of a workflow, an execution request of a workflow as an event of status change,
wherein it is determined in the executability determination step whether or not the workflow after the status change is executable when an event of the status change has been received in the event receiving step.

14. The data processing method according to claim 13, further comprising a confirmation step of confirming a storage area where the execution data of the workflow to be executed is stored when an execution request of a workflow has been received in the event receiving step,
wherein when it has been determined that the execution data is stored in the server in the confirmation step, execution data of the workflow to be executed is acquired from the server in the acquiring step, and
in the display control step, the display for the workflow to be executed is switched from the display for the inexecutable workflow to the display for the executable workflow.

15. A program stored in a computer-readable storage medium for causing a computer to execute the data processing method according to claim 8.

16. A computer-readable storage medium storing the program according to claim 15.

* * * * *